Feb. 4, 1958 C. SCHINDLER ET AL 2,822,445

STORED ENERGY DEVICE

Filed April 22, 1955 6 Sheets-Sheet 1

CARL SCHINDLER
ANTHONY VAN RYAN
INVENTORS.

BY Lee H. Kaiser

ATTORNEY

CARL SCHINDLER
ANTHONY VAN RYAN
INVENTORS.

BY Lee H Kaiser
ATTORNEY

STORED ENERGY DEVICE

CARL SCHINDLER
ANTHONY VAN RYAN
INVENTORS.

BY Lee H. Kaiser

ATTORNEY

Feb. 4, 1958 C. SCHINDLER ET AL 2,822,445

STORED ENERGY DEVICE

Filed April 22, 1955 6 Sheets-Sheet 4

CARL SCHINDLER
ANTHONY VAN RYAN
INVENTORS.

BY Lee H. Kaiser

ATTORNEY

Feb. 4, 1958 C. SCHINDLER ET AL 2,822,445

STORED ENERGY DEVICE

Filed April 22, 1955 6 Sheets-Sheet 5

CARL SCHINDLER
ANTHONY VAN RYAN
INVENTORS.

BY Lee H. Kaiser

ATTORNEY

Feb. 4, 1958 C. SCHINDLER ET AL 2,822,445

STORED ENERGY DEVICE

Filed April 22, 1955 6 Sheets-Sheet 6

CARL SCHINDLER
ANTHONY VAN RYAN
INVENTORS.

BY Lee H. Kaiser

ATTORNEY

United States Patent Office 2,822,445

Patented Feb. 4, 1958

2,822,445

STORED ENERGY DEVICE

Carl Schindler, Wauwatosa, Wis., and Anthony Van Ryan, Ocean Springs, Miss., assignors to McGraw-Edison Company, a corporation of Delaware Application April 22, 1955, Serial No. 503,090

38 Claims. (Cl. 200—109)

This invention relates to stored energy apparatus and in particular to apparatus for storing energy in spring means and releasing the stored energy to perform mechanical operations.

Stored energy spring devices for operating airbreak electrical switches have been commercially available in the past but they were in general unsatisfactory in that the output torque did not vary linearly over the entire range of output operations but instead had peaks in the curve relating output torque to number of output operations. No provision was incorporated in such prior art devices for control of the speed of output operation, and consequently, the speed of electrical switch operation was not constant and in fact decreased as the torque available from the stored energy mechanism diminished with each output operation. Further, a maximum of the stored energy was released in such prior art apparatus at the initiation of each output operation, resulting in undue shock and consequent excessive stress of the electrical switch. Although such prior art devices did provide automatic loading of the spring means, certain of them had the further disadvantage that manual operation of the electrical switch was impossible. Further, such prior art stored energy mechanisms were inherently dangerous in that an operator could easily be injured in attempting to manually operate the switch or to manually load the spring means if the apparatus was accidentally operated during the attempted manual operation. No control means was provided in most of the conventional stored energy spring devices to automatically initiate the loading of the spring means after the release of a predetermined amount of energy and to stop the loading of the spring means after sufficient energy for a predetermined number of switch operations had been stored therein.

It is an object of the invention to provide an improved stored energy device capable of providing output torque which varies linearly over the entire range of output operations.

A further object of the invention is to provide a stored energy spring device which smoothly and uniformly releases the stored energy.

A still further object is to provide such a stored energy spring device which has constant speed of output operation irrespective of the output torque available from the spring means, in other words regardless of the number of output operations that have been accomplished without further loading of the spring means.

Another object of the invention is to provide such an improved stored energy spring mechanism having means to adjust the speed of output operation.

A still further object of the invention is to provide an improved stored energy spring mechanism which automatically controls the loading of the spring means to initiate loading after the release of a predetermined amount of energy and which stops the winding of the spring means after a predetermined amount of energy has been stored therein.

A further object of the invention is to provide a stored energy spring mechanism for operating an airbreak electrical switch which permits manual operation of the switch independent of the stored energy mechanism and which is inherently safe during manual operation of the electrical switch.

Another object of the invention is to provide a stored energy spring mechanism for an airbreak electrical switch which permits locking of the switch in either open or closed position.

In its broadest aspect the invention comprises means to normally latch the output end of a torsion spring against movement while energy is wound into the input end of the spring, and the latching means is operable to release the output end of the spring to permit the energy stored in the spring to accomplish the desired mechanical operation. In accordance with the invention in one of its preferred forms, energy is stored in two helical springs which are disposed one within the other and connected in parallel to permit winding at one end and release of energy at the oppostie end through an output shaft which extends axially through the concentric springs. The output is delivered in steps of 180 degree rotation of the output shaft. The output end of the springs is operatively connected to the output shaft and is normally latched against rotation by either of a pair of solenoid-operated latching means disposed diametrically opposite from each other. A gear operatively connected to the input end of the springs is driven by a motor to wind the input end of the springs. The latching means is independently operable to release the output end of the springs to permit the energy stored in the springs to rotate the output shaft to accomplish the desired mechanical operation. The output end of the springs also drives a pump which forces fluid through a closed hydraulic system to brake the rotation of the output end of the springs and thus control the speed of rotation of the output shaft. A compensating orifice in the closed hydraulic system is adjustable in area to vary the retarding force of the pump. A differential mechanism connected between input and output ends controls the size of the compensating orifice as a function of the number of output operations in order to provide substantially constant output speed regardless of variation in the output torque available from the springs. The differential mechanism also controls means to energize the motor to rewind the springs after a predetermined number of output operations and to disconnect the motor after the springs are fully wound.

These and other objects of the invention will become more apparent upon consideration of the following detailed description of a preferred embodiment thereof, when taken in connection with the accompanying drawing wherein.

Figures 1, 2:
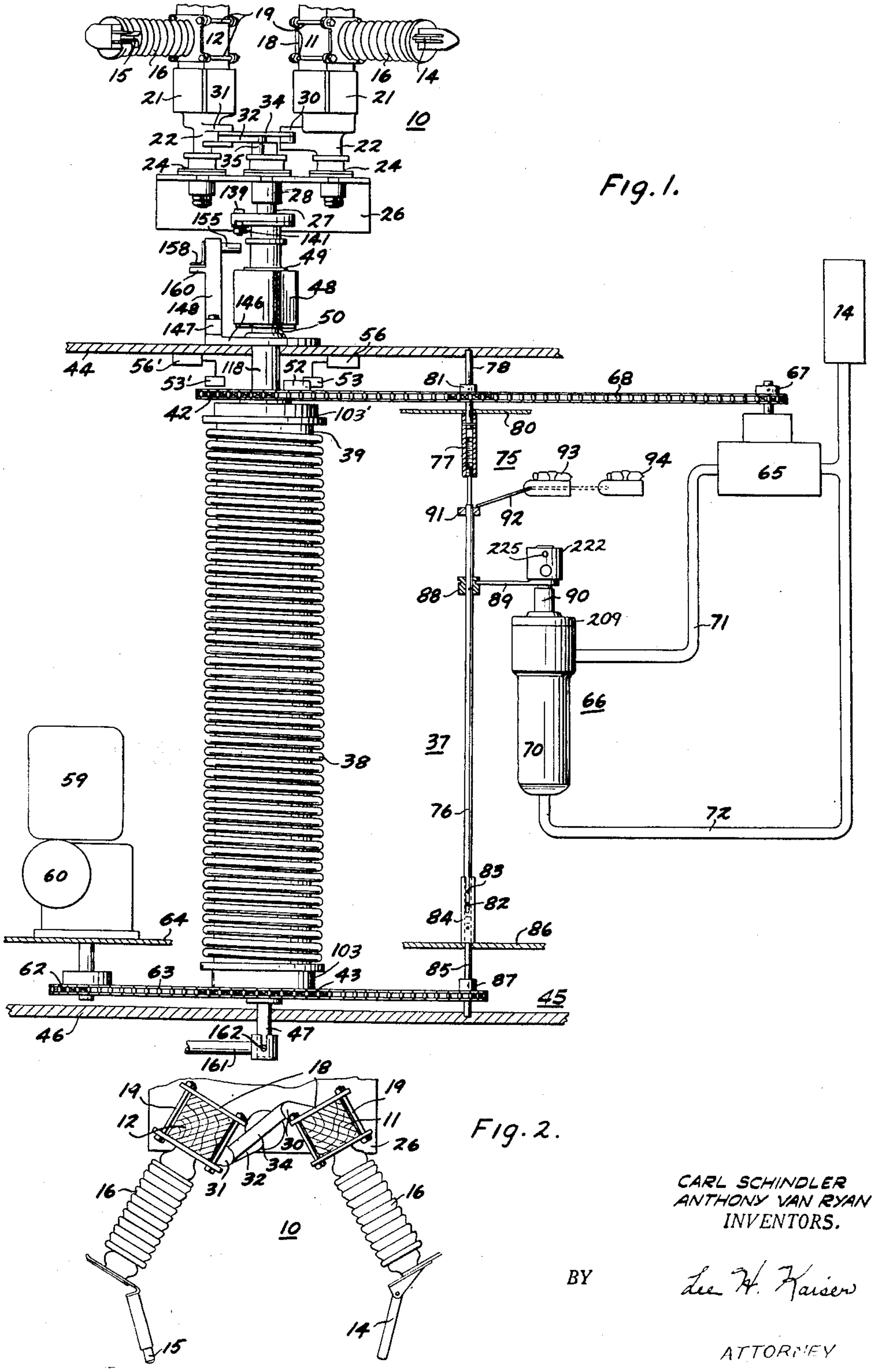
Fig. 1 is a diagrammatic front elevation view of the preferred embodiment of the stored energy spring mechanism of the invention and an airbreak electrical switch operated thereby.
Fig. 2 is a top view of the electrical switch shown in Fig. 1.

The overall construction of the preferred embodiment of the stored energy spring device of the invention and an electrical switch operated thereby will be described first with particular reference to Figs. 1 and 2 to be followed by a detailed description of the component parts of the preferred embodiment. The illustrated electrical switch 10 is of the vertical airbreak type for use on wood poles disclosed in U. S. Patent No. 2,123,976 to Van Antwerp to which reference is made for details of construction. Rotatably mounted square wood posts 11 and 12 extending parallel to the wooden pole (not shown) provide insulating shafts to which knife blade 14 and cooperating jaw contact 15 respectively are affixed. Although three vertically spaced apart sets of switch contacts 14 and 15 are conventionally provided, only a single set of switch contacts is shown in Figs. 1 and 2. Both insulating shafts formed by the wooden posts 11 and 12 rotate through approximately thirty degrees in opening and in closing the switch contacts 14 and 15. The contacts 14 and 15 are secured to post-type insulators 16 mounted by plates 18 and bolts 19 on the wood posts 11 and 12. The lower ends of wood posts 11 and 12 fit within socket clamps 21 having depending pintles 22 rotatably supported on ball bearings (not shown) within bearing housings 24 secured to the lower mounting plate, or angle iron, 26 which is rigidly affixed to the wooden pole (not shown).

A switch operating shaft 27 extending through the lower mounting plate 26 and rotatably supported on ball bearings (not shown) within a bearing housing 28 secured to the lower mounting plate 26 is rotated through 180 degrees for each opening and each closing operation of the switch contacts 14 and 15. Lever arms 30 and 31 extend radially from the depending pintles 22. Lever arm 31 associated with jaw contact 15 is pivotally connected both to one end of a switch operating lever 32 and to one end of a link 34. The opposite end of switch operating lever 32 is pivotally connected to a radially extending arm 35 on the switch operating shaft 27 at a pivot point offset from the axis of the switch operating shaft 27. The link 34 is pivotally connected at its opposite end to the lever arm 30 associated with contact 14. As switch operating shaft 27 rotates, this pivot point describes a circle with the result that switch operating lever 32 pushes on lever arm 31 to move contact 15 toward open position when said pivot point is on one side of a vertical plane common to the axes of the insulating shafts 11 and 12 and the switch operating shaft 27 and pulls on lever arm 31 to move contact 15 toward closed position when said pivot point is on the opposite side of said plane. In a similar manner link 34 pushes on lever arm 30 to move contact 14 toward closed position when said pivot point is on one side of said vertical plane and pulls on lever arm 30 to move contact 14 toward open position when said pivot point is on the opposite side of said plane.

The output of the stored energy spring mechanism of the preferred embodiment of the invention shown in Figs. 1 and 2 is delivered to electrical switch 10 in steps of 180 degree rotation of the switch operating shaft 27. A vertically disposed outer helical, or torsion, spring 38 surrounds a metallic sleeve 39 within which an inner helical, or torsion, spring 40 (see Fig. 3) is disposed. The springs 38 and 40 are both operatively connected at their upper, or output, end to an upper sprocket wheel 42 and also to an upper hub 118 which extends through and is rotatably journalled in the top plate 44 of the housing 45 for the stored energy device, the journalling means being omitted from Fig. 1. The springs 38 and 40 are both operatively connected at their lower, or input, end to a lower sprocket wheel 43 which is rotatably supported on a bearing (not seen in Fig. 1) rigidly affixed to the lower plate 46 of the housing 45. An operating, or output, shaft 47 extends axially through the concentric helical springs 38 and 40, through the upper and lower sprocket wheels 42 and 43, and through the hub 118 and is rigidly connected to the switch operating shaft 27 in a manner explained in detail hereinafter. Although the operating shaft 47 does not directly engage either sprocket wheels 42 or 43, or the hub 118, it is in operative engagement with upper hub 118 and upper sprocket wheel 42 through a hollow clutch 48 having a noncircular inner periphery which receives and closely embraces both a mating noncircular coupling 49 (see Fig. 10 for details) pinned to the operating shaft 47 and a mating noncircular collar 50 rigid with the upper hub 118 to provide a driving connection between the output end of springs 38 and 40 and the operating shaft 47.

Means are provided to normally latch the output end of the springs 38 and 40 against rotation, and the latching means is operable to release the output end of the springs to permit the energy stored in the springs 38 and 40 to rotate the output shaft 47. In the preferred embodiment a pair of latching means disposed in diametrically opposite positions are each adapted to engage and prevent rotation of the upper sprocket wheel 42, and the latching means are independently operable to release sprocket wheel 42 and permit rotation of output shaft 47 through a fraction of a revolution until sprocket wheel 42 engages the other of the latching means. It is diagrammatically represented in Fig. 1 that the upper sprocket wheel 42, and thus the operating shaft 47, is normally latched against rotation by interference between a cam 52 rigid with upper sprocket wheel 42 and either of two latches 53 and 53′ schematically illustrated at diametrically opposite positions. The latches 53 and 53′ are respectively released by solenoids shown schematically at 56 and 56′ to permit delivery of stored energy in steps of 180 degree rotation of output shaft 47. Each of the latches 53 and 53′ is adapted to interfere with cam 52 to latch sprocket wheel 42 against rotation, and operation of one latch, e. g., 53, by energization of its solenoid 56 to release cam 52 permits rotation of sprocket wheel 42 through 180 degrees until cam 52 engages the latch 53′ disposed diametrically opposite therefrom. The latches 53 and 53′ and the solenoids 56 and 56′ are supported on the bottom surface of the top plate 44 of the stored energy mechanism housing 45.

A motor operated gear drive winds the lower end of the parallel connected springs 38 and 40 to store energy therein while the upper sprocket wheel 42 operatively connected to the upper end of these springs is normally prevented from rotating by the latches 53 and 53′. An electric motor 59 rotates the lower sprocket wheel 43 through conventional reduction gearing 60, a sprocket wheel 62 on the output shaft of the reduction gearing 60, and a chain 63 engaging the sprocket wheels 43 and 62. The reduction gearing 60 permits driving in one direction only and thus serves to retain the springs 38 and 40 in wound condition. The motor 59 and reduction gearing 60 are supported upon a shelf 64 of the stored energy mechanism housing 45.

A hydraulic braking device controls the speed of rotation of the operating shaft 47 in order to prevent damage to the airbreak electrical switch 10. Constant speed of rotation of output shaft 47 is provided irrespective of the output torque available from springs 38 and 40. This retarding device includes a hydraulic pump 65 which forces fluid through a closed hydraulic system 66 having a "compensating orifice" which is varied in area as a function of output torque available in springs 38 and 40 in order to provide constant speed of operation of output shaft 47. A sprocket wheel 67 on the shaft of the hydraulic pump 65 is rotated by a chain 68 which engages and is driven by the upper sprocket wheel 42. The variable area "compensating orifice" of the preferred embodiment is in the form of a plurality of orifices (see Fig. 7) within a cylinder 70. The closed hydraulic system 66 includes the pump 65, the cylinder 70, a conduit 71 between the output end of pump 65 and the inlet passage of the cylinder 70 and a conduit 72 between the outlet passage of the cylinder 70 and the inlet end of the pump 65. A reservoir 74 communicates with the closed hydraulic system 66. As explained in detail hereinafter, during each 180 degree rotation of operating shaft 47 an additional orifice within cylinder 70 is uncovered and placed in parallel with those already uncovered to increase the area of the "compensating orifice." Thus, as the output torque available from the springs 38 and 40 decreases with each output operation of the stored energy mechanism 37, the retarding force of the pump 65 becomes smaller. Consequently, the speed of operation of the stored energy mechanism 37 is substantially constant for the four output operations which can be stored in the springs 38 and 40 of the preferred embodiment.

The uncovering of an additional orifice in the closed hydraulic system 66 during each operation of the stored energy mechanism 37 is controlled by a differential mechanism 75 connecting the input and output ends. The differential mechanism 75 includes a vertical differential rod 76 which engages an internally threaded sleeve 77. The sleeve 77 at its upper end receives and is pinned to a shaft 78 which extends freely through an abutment 80 of the stored energy mechanism housing 45 and is affixed to a sprocket wheel 81 driven by the chain 68. A pin 82 through the lower end of differential rod 76 rides in a vertical slot 83 in a sleeve 84, thus permitting axial movement of differential rod 76 relative to sleeve 84 but preventing its rotation relative thereto. The lower end of sleeve 84 receives and is pinned to a shaft 85 extending freely through an aperture in an abutment 86 of the stored energy mechanism housing 45 and rotatably journalled in the lower plate 46. The shaft 85 is pinned to a sprocket wheel 87 which engages and is driven by chain 63.

When output shaft 47 is rotated to release energy stored in springs 38 and 40, sleeve 77 is driven through chain 68 and sprocket wheel 81 in a direction to further engage the threads on the upper end of differential rod 76 and lift rod 76 upward. Differential rod 76 is free to axially advance and recede relative to sleeve 77 but is prevented from rotating with sleeve 77 by the interference between pin 82 through the lower end of differential rod 76 and vertical slot 83 in sleeve 84. When differential rod 76 is lifted during the release of stored energy, a collar 88 affixed thereto raises an arm 89 secured to a valve 90 slidable within cylinder 70 to uncover another orifice in the closed hydraulic system 66 and thus decrease the retarding force for the succeeding operation of the stored energy mechanism.

However, if the motor 59 is energized to store energy in the springs 38 and 40, the chain 63 through sprocket wheel 87 rotates sleeve 84, and thus the differential rod 76, in a direction to unthread rod 76 from sleeve 77, i. e., in a downward direction, and consequently to again obstruct the orifices which were opened when stored energy was released. Thus the minimum number of orifices are open and a maximum braking force is provided to retard rotation of output shaft 47 when a maximum of energy is stored in springs 38 and 40.

A collar 91 affixed to differential rod 76 engages a pivoted arm 92 to operate both a mercury switch 93 which controls the energization of motor 59 (see Fig. 13) and a mercury switch 94 which prevents further output operations after the release of a predetermined amount of energy from springs 38 and 40 as explained in detail hereinafter. During the first output operation, the differential rod 76 is threaded sufficiently into sleeve 77 to raise arm 92 until switch 93 assumes a horizontal position and completes the electrical circuit to energize motor 59. As motor 59 winds the lower end of springs 38 and 40, the differential rod 76 is threaded out of sleeve 77 to lower arm 92 until switch 93 is tilted sufficiently to open the electrical circuit to motor 59.

If electrical power is not available to energize motor 59, after four operations of electrical switch 10 the differential rod 76 is threaded sufficiently into sleeve 77 to raise collar 91 until mercury switch 94 is tilted to open the electrical circuit to solenoids 56 and 56' (see Fig. 13) and prevent excessive unwinding of springs 38 and 40.

Figures 3, 4:
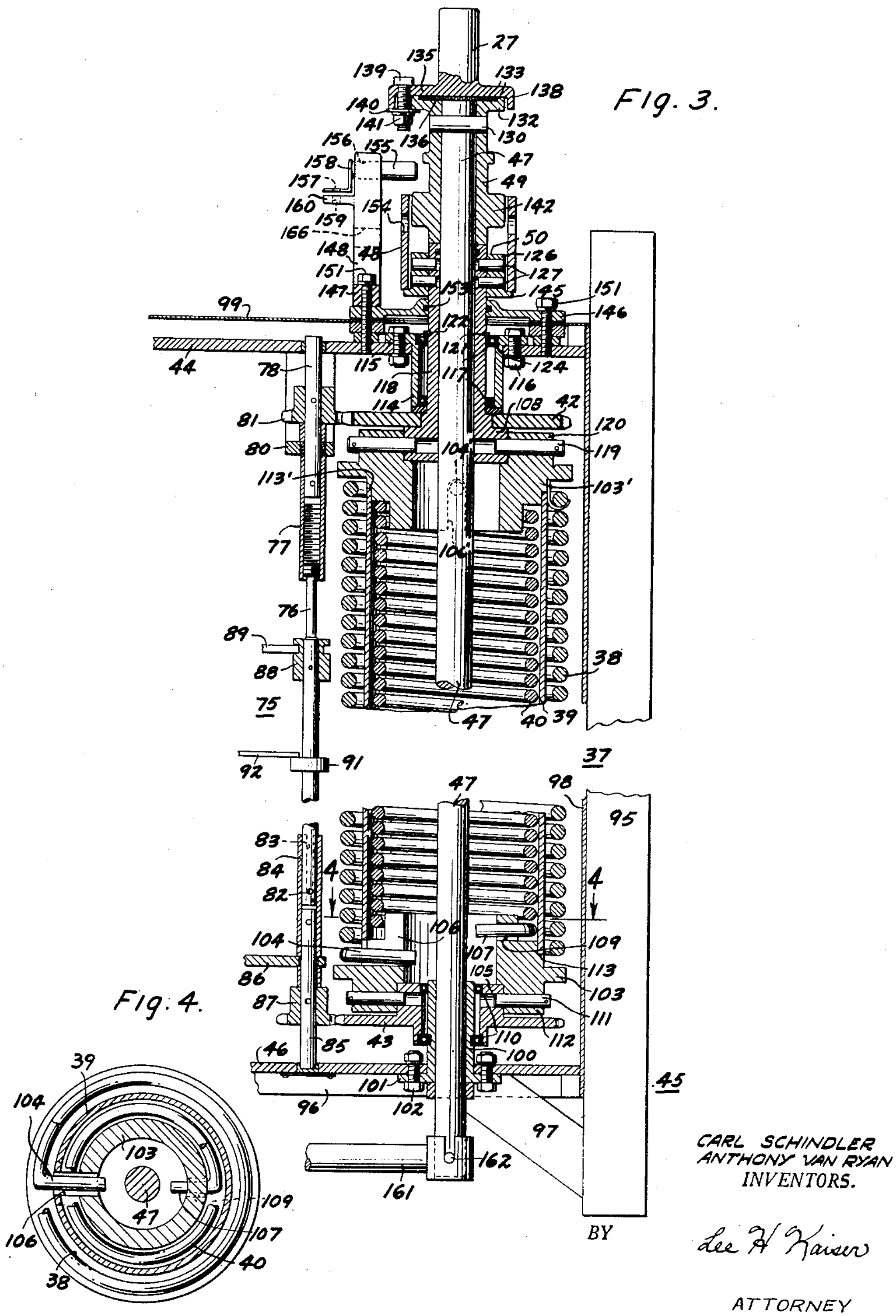
Fig. 3 is a vertical sectional view through the preferred embodiment of Fig. 1 with the latching means for controlling the release of stored energy omitted.
Fig. 4 is a horizontal section view taken on line 4—4 of Fig. 3.

As shown in Fig. 3 the upper plate 44 and lower plate 46 are supported upon vertical members 95, preferably angle iron, welded to horizontal members 96 with angle braces 97 therebetween to provide additional strength for the housing 45. Side plates 98 and a cover 99 enclose the stored energy spring mechanism 37. A lower bearing support sleeve 100 having a radially extending flange 101 secured to the lower plate 46 by bolts 102 rotatably journals the lower end of the operating shaft 47. Identical spring coupling members 103 and 103' are affixed to the lower and upper ends respectively of both springs 38 and 40. The extremities 104 and 104' at the lower and upper ends respectively of outer spring 38 are bent radially inward and fit within radially extending slots 106 and 106' in the lower and upper spring coupling members 103 and 103' respectively. It will be appreciated that the horizontal sectional view of Fig. 4 is accurate whether taken through lower spring coupling member 103 looking downward, as indicated on the drawing, or whether taken through upper spring coupling member 103' looking upward. The extremities 107 (upper extremity not seen in Fig. 3) at both ends of inner spring 40 are bent radially inward and fit within radial apertures 109 (not seen in upper spring coupling member 103' in Fig. 3) in the hubs of spring coupling members 103 and 103'. Ballbearings 110 surrounding and supported on the lower bearing support sleeve 100 above the lower plate 46 rotatably journal the lower sprocket wheel 43 which is rigidly affixed to the lower spring coupling member 103 by pins 111 extending through radial apertures in downwardly extending bosses 112 on member 103 into a hub 105 on the sprocket wheel 43. Radially extending circumferential shoulders 113 and 113' on the lower and upper spring coupling members 103 and 103' respectively support the lower and upper ends of the cylinder 39 separating the inner spring 40 from the outer spring 38.

In order to simplify and facilitate the understanding of the drawing, the means for normally latching the upper sprocket wheel 42 against rotation and for controlling the release of stored energy has been omitted from Fig. 3. An upper ball bearing housing sleeve 114 extending through the upper plate 44 and having a radially extending flange 115 secured to the upper plate 44 by bolts 116 encloses and supports ball bearings 117 which rotatably journal the upper hub 118. The upper sprocket wheel 42 has an axial aperture therethrough and fits over the hub 118 and is supported on a radially extending shoulder 108 on the hub 118. The upper sprocket wheel 42 is operatively connected to the upper spring coupling member 103' by means omitted from Fig. 3 but shown in Figs. 5 and 6 and described in detail hereinafter. The operating shaft 47 extends axially through the upper sprocket wheel 42 and the upper hub 118 and rotates freely therein. The upper hub 118 is rigidly affixed to the upper spring coupling member 103' by pins 119 extending through radial apertures in raised bosses 120 on the member 103' into a radially extending aperture in the hub 118. A retaining ring 121 fitting within a circumferential groove 122 in the hub 118 above the upper one of the ball bearings 117 prevents downward movement of upper hub 118 and upper sprocket wheel 42. The upper one of the ball bearings 117 is supported upon a radially extending shoulder 124 in the inner circumference of the upper ball bearing housing 114.

Figure 10:
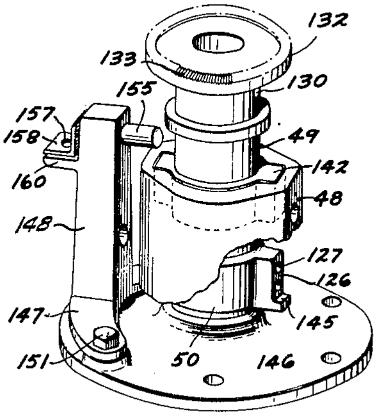
Fig. 10 is a perspective view of the means for permitting manual operation of the airbreak electrical switch independent of the stored energy spring means.

As best seen in Fig. 10 the clutch driving collar 50 surrounding and rigidly affixed to the upper hub 118 has radially extending lugs 126 at diametrically opposite portions of the exterior periphery thereof to provide a noncircular outer periphery. In order to provide added mechanical strength between the output end of the springs 38 and 40 and the driving member of the clutch, a plurality of pins 127 extend radially through the lugs 126 into the upper hub 118 to rigidly affix collar 50 to upper hub 118. The generally tubular coupling 49 embraces the output shaft 47 above the collar 50 and the upper hub 118 and is rigidly affixed to the operating shaft 47 by a pin 130. Integral with the coupling 49 at its upper end is a radially extending circumferential flange 132 having a plurality of radially extending serrations 133 on the upper face near the outer margin thereof. The switch operating shaft 27 terminates at its lower end in a radially extending flange 135 abutting against the flange 132 and having a plurality of radially extending serrations 136 on the bottom face near the outer margin thereof complementary to the serrations 133 on the coupling 49 and mating therewith to engage the stored energy mechanism output shaft 47 with the switch operating shaft 27. A depending skirt 138 on the flange 135 embraces the outer periphery of the flange 132. The flanges 132 and 135 are maintained in abutment by bolts 139 protruding through apertures in an extension of flange 135, washers 140 on the bolts 139 beneath the flange 132, and nuts 141 threaded on bolts 139 beneath washers 140. The mating serrations 133 and 136 provide a driving connection between stored energy mechanism output shaft 47 and switch operating shaft 27 and permit angular displacement of these shafts to provide, within 2½ degrees, adjustments over a range of 360 degrees.

In order to provide a noncircular outer periphery on the member driven by clutch 48, the coupling 49 is provided at diametrically opposite positions with radially extending lugs 142 which are identical in contour to the lugs 126 on the collar 50. When the radially extending lugs 126 and 142 are disposed in a common plane, clutch 48, having a noncircular inner periphery conforming to the configuration of the lugs 126 and 142, may closely embrace both sets of lugs 126 and 142 to furnish an operative driving connection between collar 50 and coupling 49 and thus also provide operative engagement between the output end of the springs 38 and 40 and the operating shaft 47.

In order to normally connect the driving member of the clutch, i. e., the collar 50 with the driven member, i. e., the coupling 49, and thus operatively connect the output end of springs 38 and 40 with shaft 47, the clutch 48 is normally disposed to rest upon radial extensions 145 on the lower end of lugs 126. If it is desired to disengage the electrical switch 10 from the stored energy mechanism 37, the clutch 48 is lifted vertically until its inner periphery is free of the lugs 126 on collar 50, at which time the shaft 47 is free of the hub 118 and the switch 10 can be manually operated independently of the springs 38 and 40.

Bolts 151 secure an annular plate 146 surrounding the hub 118 above the stored energy mechanism housing cover 99 and the generally arcuate base portion 147 of a vertically disposed pin lock post 148 to the top plate 44. A resilient O-ring gasket 153 compressed within a circumferential groove in the inner periphery of the annular plate 146 against the hub 118 prevents leakage of moisture into the stored energy mechanism housing 45. A radially extending aperture 154 in the clutch 48 is adapted to receive a lock pin 155 which is freely slidable horizontally within an opening 156 near the top of the pin lock post 148 to retain the clutch 48 raised above the lugs 126 on collar 50 but in engagement with the lugs 142 on coupling 49. In this position of clutch 48 the switch operating shaft 27 and stored energy mechanism shaft 47 are free of upper hub 118 and the output end of springs 38 and 40 but are locked against turning by the lock pin 155 within the aperture 154 so that the clutch 48 and the coupling 49 cannot rotate. Thus the switch operating shaft 27 is disconnected from upper hub 118 and locked against rotation, and if desired the upper sprocket wheel 42 and upper hub 118 can be rotated to release energy stored in springs 38 and 40 completely independent of coupling 49 and electrical switch 10. An aperture 157 through a bracket 158 affixed to the lock pin 155 is in register with a vertical aperture 159 in an arm 160 on the lock pin post 148 when the lock pin 155 is within the aperture 154 to permit a padlock to be inserted through apertures 157 and 159 and thus lock the switch 10 in desired position.

For manual operation of electrical switch 10, the lock pin 155 is first retracted to permit the clutch 48 to be lifted upward until it is free of both sets of lugs 126 and 142, the lock pin 155 is then inserted within opening 166, and the clutch 48 is rested upon lock pin 155. In this position also the operating shaft 47 and the switch operating shaft 27 connected thereto are both free of upper hub 118, and the switch 10 can be manually operated by engaging a suitable wrench 161 with a pin 162 extending radially through the lower end of shaft 47 beneath the lower plate 46. It will be apparent that, inasmuch as both shafts 27 and 47 are free of upper hub 118, the disclosed apparatus is absolutely safe in that accidental release of stored energy resulting in rotation of upper hub 118 during manual operation of switch 10 cannot effect rotation of shafts 27 and 47.

Although because of the direction from which Fig. 3 was taken it would appear in this view that sprocket wheels 42 and 43 directly mate with sprocket wheels 81 and 87 respectively, it will be appreciated that these members are not directly engaged but instead are operatively connected through the chains 68 and 63 as shown in Fig. 1.

Figure 5:
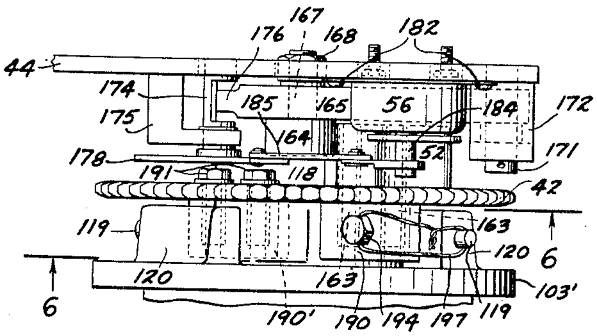
Fig. 5 is an enlarged side elevation view of the output end of the preferred embodiment of Fig. 1 with the chain drive omitted.
Figure 6:
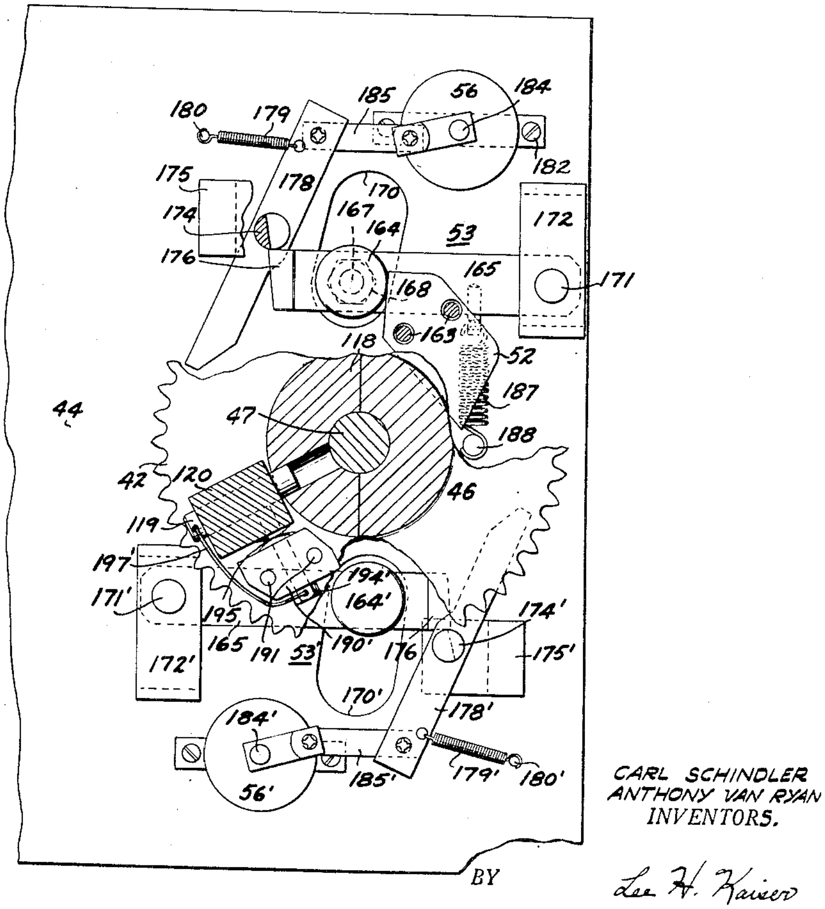
Fig. 6 is an enlarged sectional view taken on line 6—6 of Fig. 5 with some of the elements partially broken away to better illustrate the cooperative relationship of the latching means for controlling the release of stored energy.
Figure 8:
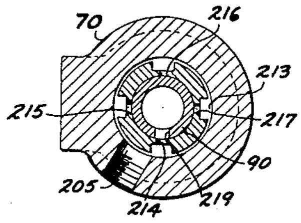
Fig. 8 is a horizontal sectional view taken on line 8—8 of Fig. 7 but with the elements rotated axially from their position in Fig. 7 to illustrate the communication of the inlet port with the compensating orifice.

In the preferred embodiment each of a pair of diametrically opposite, solenoid-operated latching means is adapted to engage and prevent rotation of upper sprocket wheel 42, and each latching means is operable upon energization of its solenoid to release the sprocket wheel 42 to permit rotation of output shaft 47 through 180 degrees until the sprocket wheel 42 engages the other latching means. As shown in Figs. 5 and 6 the upper sprocket wheel 42 is normally latched against rotation by interference between cam 52, which is rigidly affixed to the upper face of sprocket wheel 42 by bolts 163, and either cam follower 164 or cam follower 164' which respectively are rotatably mounted on the cam follower arms 165 and 165' of the latches 53 and 53'. Only the latch 53 will be described, the latch 53' being identical thereto. The latch 53 includes the circular cam follower 164 revoluble about a pin 167 extending through an aperture in the cam follower arm 165 and threadably engaging a nut 168 on the upper side of the arm 165. The nut 168 is within an elongated slot 170 in upper plate 44 to permit pivotal movement of cam follower arm 165 about a vertical pivot pin 171. The cam follower arm 165 is pivotally supported upon the pivot pin 171 which extends between the upper plate 44 and a U-shaped bracket 172 welded to the upper plate 44.

The force exerted by wound springs 38 and 40, acting through upper sprocket wheel 42 and cam 52 against cam follower 164, has a component tending to rotate cam follower arm 165 outward. However, a rotatable half shaft 174 extending from the top plate 44 through an L-shaped bracket 175 welded to the top plate 44 normally interferes with the free end 176 of cam follower arm 165 and prevents outward pivoting thereof. The end of the half shaft 174 extending through and below bracket 175 is rigidly affixed to a lever arm 178. A coil spring 179 affixed at one end to a pin 180 secured to top plate 44 and at the opposite end to one end of lever arm 178 normally retains the lever arm 178 in a position so that the half shaft 174 interferes with outward movement of the free end 176 of cam follower arm 165.

The solenoids 56 and 56′ of both latching means are identical and only solenoid 56 will be described. Solenoid 56 is affixed to upper plate 44 by screws 182 and is adapted when energized to rotate its armature 184. A linkage 185 is affixed at one end to the armature 184 and at its opposite end is pivotally connected to one end of the lever arm 178. Rotation of armature 184, upon energization of solenoid 56, actuates linkage 185 to pivot lever arm 178, and thus half shaft 174, in a direction to release the outer end 176 of cam follower arm 165. The force stored in the springs 38 and 40, acting through upper sprocket wheel 42 and cam 52 against the revoluble cam follower 164, forces the cam follower arm 165 to pivot outward and permits upper sprocket wheel 42 (and thus shaft 47) to rotate through 180 degrees until cam 52 comes into engagement with cam follower 164′ disposed diametrically opposite from cam follower 164. A helical spring 187 affixed at one end to a pin 188 secured to the top plate 44 and at the opposite end to the cam follower arm 165 returns the cam follower 164 toward the inner end of slot 170 where it is in position to engage cam 52 and stop rotation of upper sprocket wheel 42 after energization of solenoid 56′ to provide a subsequent operation of electrical switch 10.

It will thus be seen that in the preferred embodiment the stored energy is released in steps of 180 degree rotation of upper sprocket 42 and operating shaft 47. The upper sprocket wheel 42 is normally prevented from rotation by the cam 52 abutting against one of the cam followers 164 or 164′, and energization of the corresponding solenoid 56 or 56′ rotates the corresponding half shaft 174 or 174′ to release the corresponding cam follower arm 165 or 165′ to permit 180 degree rotation of upper sprocket wheel 42 until the cam 52 comes into engagement with the diametrically opposite cam follower 164 or 164′.

The bolts 163 which affix cam 52 to upper sprocket wheel 42 extend through sprocket wheel 42 and threadably engage a bumper 190 of general box shape to rigidly secure both the cam 52 and bumper 190 to upper sprocket wheel 42 on opposite sides thereof. Bolts 191 rigidly secure a bumper 190′, identical to the bumper 190, to the under side of the upper sprocket wheel 42 at a position diametrically opposite from the bumper 190. The bumpers 190 and 190′ are secured to the upper spring coupling member 103′ by bolts 194 and 194′ extending horizontally through apertures in the bumpers 190 and 190′ respectively and threadably engaging the bosses 120 which as explained hereinbefore are integral with and disposed at diametrically opposite portions of member 103′. Pairs of opposed spring washers, or Belleville washers, 195 circumjacent the bolts 194 and 194′ between the bumper 190 and one boss 120 and between the bumper 190′ and diametrically opposite boss 120 respectively absorb any shock caused when the cam 52 is brought into engagement with a cam follower 164 or 164′. A wire 197 threaded through apertures in the bolt 194 and one pin 119 and a wire 197′ similarly threaded through apertures in the bolt 194′ and the other pin 119 prevent removal of the pins 119.

It may facilitate the understanding of the invention to summarize the connections between the elements of the means to release the stored energy by pointing out that the output end of springs 38 and 40 directly engage upper coupling member 103′ which is rigidly affixed to hub 118 by pins 119, and that hub 118 is rigidly affixed to the driving member 50 of clutch 48 by pins 127. Further, the latching means engage cam 52 which is rigidly affixed to upper sprocket wheel 42 by bolts 163, and the sprocket wheel 42 is operatively connected to upper coupling member 103′ by the bolts 163 and 191 which rigidly affix the bumpers 190 and 190′ to the upper sprocket wheel 42 as well as the bolts 194 and 194′ which secure the bumpers 190 and 190′ respectively to the bosses 120 on the upper coupling member 103′.

The differential mechanism 75 controls the energization of the motor 59 which stores energy in springs 38 and 40 and also prevents further release of stored energy after a predetermined number of operations of electrical switch 10 without rewinding the springs. As explained hereinbefore the springs 38 and 40 are wound at the lower, or input, end and energy is delivered at the upper, or output, end. This arrangement permits delivery of energy at the output end of the springs in the form of rotation of output shaft 47 simultaneously with the rotation of lower sprocket wheel 43 by motor 59 to wind the input end of springs 38 and 40. Four complete revolutions of the lower end of springs 38 and 40 are necessary to store the maximum amount of energy in the springs. However, only the final two revolutions are used to provide four 180 degree output operations of electrical switch 10. Since it is necessary to supply four stored energy operations, excess energy must be stored in the springs 38 and 40 at the first operation to compensate for the inherent drooping characteristic of the springs 38 and 40.

Figure 7:
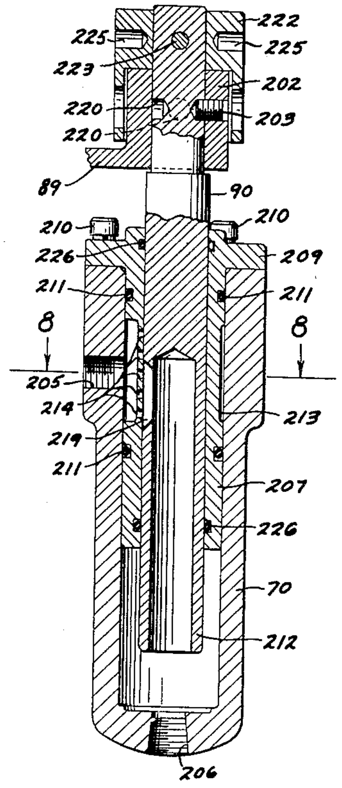
Fig. 7 is a vertical sectional view through the cylinder which provides a variable area compensating orifice controlled by the differential mechanism to yield constant speed of output operation of the preferred embodiment of Fig. 1.

As the output torque available from springs 38 and 40 decreases with each operation of the electrical switch 10, it is desirable that the retarding action of hydraulic pump 65 decrease with each operation of switch 10 so that the speed of operation is constant over the four operations of switch 10. As explained hereinbefore this variation in retarding force is provided by uncovering an additional orifice in the closed hydraulic system 66 during each operation of the electrical switch 10. The collar 88 on the differential rod 76 engages the radially extending arm 89 which is rigid with slide valve 90 to raise and lower slide valve 90 with the differential rod 76. As shown in Fig. 7 the arm 89 is integral with a collar 202 surrounding the slide valve 90 and secured thereto by a set screw 203.

The closed hollow cylinder 70 is provided with an inlet port 205 in which the conduit 71 is threadably engaged and with an outlet port 206 in which the conduit 72 is threadably engaged. A cylinder insert sleeve 207 fitting snugly within cylinder 70 has a radially extending flange 209 at the upper end thereof which is fastened to cylinder 70 by bolts 210. Resilient O-ring gaskets 211 fitting with circumferential grooves in the outer periphery of cylinder insert sleeve 207 provide a liquid-tight seal between cylinder 70 and insert sleeve 207 above and below the inlet port 205, permitting insert sleeve 207 to obstruct passage of fluid between inlet port 205 and outlet port 206. The slide valve 90 is slidable and rotatable within the insert sleeve 207 and terminates at its lower end in a tubular portion 212. A circumferential groove 213 in the outer periphery of sleeve insert 207 in register with the inlet port 205 provides an inlet header in communication with four peripherally spaced apart sets of orifices 214, 215, 216 and 217 extending radially through the sleeve insert 207 and displaced approximately ninety degrees from each other. Each set of orifices 214, 215, 216 and 217 comprises five axially spaced orifices in a vertical plane coincident with the axis of cylinder 70. All of the orifices in a given set are of the same size, e. g., all the orifices 214 are identical in size, but the orifices in the different sets vary progressively in size, e. g., the orifices 215 are larger than the orifices 214.

Four sets of orifices 214, 215, 216 and 217 are provided to permit the operator to select the proper speed of operation for the electrical switch 10 as will be explained hereinafter. However, only one set of orifices is used at any one time. An axially extending elongated slot 219 is provided through the tubular portion 212 of the slide valve 90 leading to the axial compartment therein. The slot 219 extends peripherally over only a small portion of the circumference of the tubular portion 212 and with a given setting of the apparatus can thus be in register with only one of the sets of orifices 214, 215, 216 and 217 while the tubular portion 212 obstructs the other three sets of orifices. As illustrated in the drawing, the slot 219 is in register with the set of orifices 214. Further, as illustrated in Fig. 7 the slide valve 90 is in a position wherein only three of the five axially spaced apart orifices 214 are in communication with the slot 219 which leads to the outlet port 206.

As explained hereinbefore, release of stored energy to operate electrical switch 10 drives chain 68 to rotate sleeve 77 in a direction to lift differential rod 76, and thus collar 88 axially upward. As a consequence the slide valve 90 through arm 89 is moved upward sufficiently during each output operation to bring another orifice 214 into communication with slot 219 and thus further reduce the retarding action of the pump 65 forcing fluid through the closed hydraulic system 66. It will be appreciated that as illustrated, with three orifices 214 uncovered, two output operations of the stored energy mechanism of the invention have been accomplished and that the next orifice 214 in an upward direction will be brought into registry with slot 219 during the succeeding output operation.

It will also be appreciated that when motor 59 is energized to drive chain 63 to store energy into the lower end of springs 38 and 40, differential rod 76 is rotated in a direction out of sleeve 77 and in lowering arm 89 causes the slide valve 90 to cover an additional orifice 214 and thus increase the retarding force of pump 65.

The circumferential groove 213 in the outer periphery of sleeve insert 207 provides communication between the inlet port 205 and all of the orifices 214, 215, 216 and 217. If it is desired to change the size of the orifices to provide a different operating time for the electrical switch 10, the set screw 203 is first unthreaded to free the slide valve 90 from the collar 202. Four holes 220 circumferentially spaced approximately ninety degrees from each other are provided in the slide valve 90 to receive the set screw 203. An adjustment cap 222 rigidly affixed to the upper end of slide valve 90 by a pin 223 is provided with three sets of diametrically opposite apertures 225 to receive a wrench and thus facilitate turning of slide valve 90 relative to arm 89 and cylinder 70 in order to bring a different one of the sets of orifices 214, 215, 216 or 217 into communication with slot 219 in slide valve 90. The holes 220 in the slide valve 90 are in vertical planes coincident with the orifices 214, 215, 216 and 217 and give an indication that the corresponding set of orifices 214, 215, 216 or 217 is in registry with the slot 219 when the set screw 203 can be advanced into the hole 220. Resilient O-ring gaskets 226 within circumferential grooves in the inner periphery of the insert sleeve 207 above and below the sets of orifices 214, 215, 216 and 217 provide a liquid-tight seal between insert sleeve 207 and slide valve 90.

Figure 9:
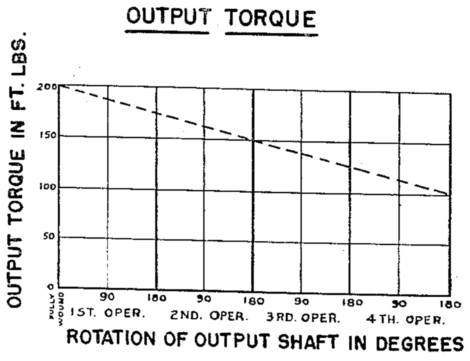
Fig. 9 is a curve showing that the output torque available from the preferred embodiment of Fig. 1 varies linearly with the number of output operations.

Fig. 9 illustrates that the available output torque stored in the springs 38 and 40 varies linearly when plotted versus rotation of output shaft 47 in degrees from its initial fully wound position, or when plotted versus number of output operations of the stored energy mechanism 37. It will be appreciated that the uncovering of an additional orifice 214 with each output operation decreases the retarding force of the pump 65 and provides constant output speed over the four operations of the stored energy mechanism 37. When the spring tension is highest, the total "compensating orifice" area is the smallest. Each time the spring tension is decreased, the total orifice area is increased sufficiently to maintain constant speed of operation of electrical switch 10.

Figure 11:
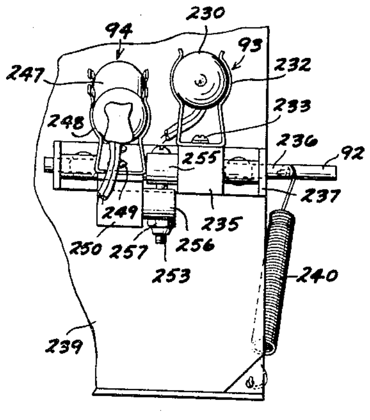
Figs. 11 and 12 are front and side elevation views respectively of limit switches actuated by the differential mechanism of the preferred embodiment.
Figure 12:
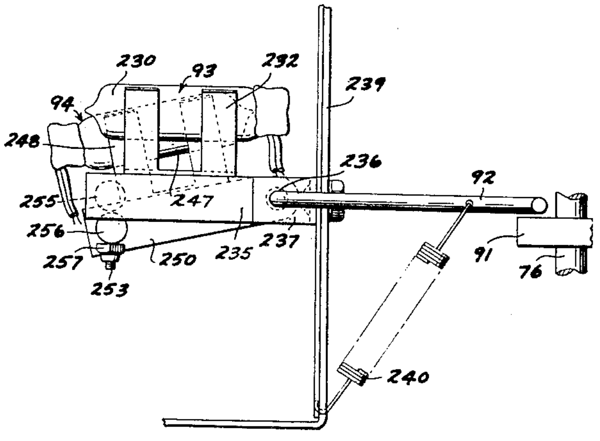

The differential mechanism 75 also controls the energization of the motor 59 to provide automatic loading of the springs 38 and 40 and to prevent excessive unwinding of the springs. The stored energy mechanism 37 automatically maintains the springs 38 and 40 fully wound with sufficient stored energy to provide four output operations. The 115 volt alternating current circuit to motor 59 over conductors 226 and 227 is completed through a mercury filled switch 93 as shown schematically in Fig. 13. The mercury of switch 93 is housed within a glass envelope 230 (see Figs. 11 and 12) containing two electrodes (not shown) across which the mercury is adapted to bridge and complete the energizing circuit to motor 59. The glass envelope 230 is detachably mounted within a clip 232 which is secured by screws 233 to a support member 235. The support member 235 is affixed to a shaft 236 which is pivotally mounted in a U-shaped bracket 237 secured to a vertical wall 239 of the stored energy mechanism housing 45. The arm 92 adapted to be engaged by collar 91 on differential rod 76 is integral with the shaft 236. A helical spring 240 attached at one end to the wall 239 and at the opposite end engaging the radially extending arm 92 on the shaft 236 normally maintains the support member 235 in a position wherein the envelope 230 is tilted sufficiently so that the electrical circuit to the motor 59 is opened by the switch 93.

When the differential rod 76 is threaded further within sleeve 77 during an output operation, collar 91 engages and raises arm 92 sufficiently to tilt the glass envelope 230 to a horizontal position wherein the mercury switch 93 completes the electrical circuit to energize motor 59. Thus in the preferred embodiment the motor 59 is energized after a single operation of electrical switch 10 to initiate loading of the springs 38 and 40. In winding the lower end of springs 38 and 40, chain 63 rotates differential rod 76 in a direction out of sleeve 77 until the envelope 230 is pivoted sufficiently about shaft 236 to open the circuit to motor 59 and thus stop the loading of the springs 38 and 40 after sufficient energy has been stored therein for four output operations.

Figure 13:
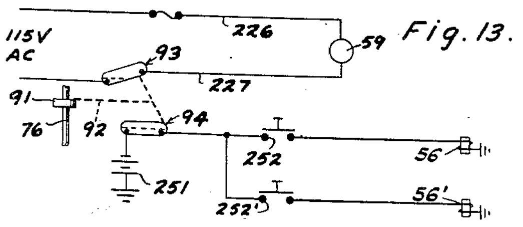
Fig. 13 is a simplified schematic diagram of the electrical wiring of the preferred embodiment.

The electrical switch 94 comprises mercury within a glass envelope 247 detachably mounted on a clip 248 secured by screws 249 to a support member 250. The switch 94 is adapted to open the circuit to the solenoids 56 and 56′ after four operations of electrical switch 10 without rewinding of the springs 38 and 40. As schematically illustrated in Fig. 13, the switch 94 normally completes an electrical circuit between a battery 251 and the normally open contacts of push buttons 252 and 252′ which are adapted when manually depressed to complete electrical circuits to operate the solenoids 56 and 56′ respectively. The support member 250 is affixed to the shaft 236 which is normally held in a position by spring 240 wherein the glass envelope 247 is horizontal and the mercury therein bridges electrodes within the glass envelope 247 so that the electrical circuit between the battery 251 and the contacts of push buttons 252 and 252′ is completed by mercury switch 94.

If no alternating current power is available to energize motor 59, after four output operations of the stored energy mechanism the differential rod 76, and thus collar 91, is raised sufficiently to tilt envelope 247 to a position where the switch 94 opens the electrical circuit between battery 251 and the contacts of the push button switches 252 and 252′. It will be apparent that in this latter condition of the stored energy mechanism 37, the solenoids 56 and 56' cannot be operated by depression of push button switches 252 and 252' respectively, and that excessive unwinding of the springs 38 and 40 is thus prevented.

A machine screw 253 protruding through registering clearance holes in studs 255 and 256 extending laterally from support members 235 and 250 respectively provides means to adjust the operation of switches 93 and 94. It will be appreciated that tightening of nut 257 on screw 253 will bring support members 235 and 250 closer together angularly and vary the setting relative to differential rod 76 at which the glass envelopes 230 and 247 of mercury switches 93 and 94 respectively reach or depart from the horizontal to open or close the corresponding electrical circuits. Although in the preferred embodiment the switch 93 is adjusted to complete the energizing circuit to motor 59 after a single output operation, it will be apparent that the switch 93 can be readily adjusted to complete the energizing circuit to motor 59 after any desired number of output operations. Further, switch 94 can be readily adjusted to open the circuit to solenoids 56 and 56' after any desired number of output operations.

While the preferred embodiment of the invention has been illustrated and described as providing output in the form of 180 degree revolution of a shaft, it will be appreciated that electrical switches requiring a different form of operating stroke than 180 degree shaft rotation can be satisfactorily actuated by the apparatus of the invention. The stored energy device of the invention has been satisfactorily utilized for the actuation of electrical switches requiring only 120 degree rotation of a switch operating shaft to move the switch contacts between open and closed position by the inclusion of conventional lever means for converting the half revolution of the stored energy mechanism output shaft 47 into one third revolution of the switch operating shaft. Further, it will be appreciated that the invention is not limited to a stored energy device for providing output in the form of 180 degree shaft rotation, but that any desired number of latching means may be peripherally spaced apart around the output shaft 47 to limit the output stroke to a desired fraction of a revolution of the upper toothed gear 42.

Push buttons 252 and 252' are conveniently marked "open" and "close" to indicate the position to which electrical switch 10 is actuated upon depression of the corresponding push button. If the clutch 48 is raised above the lugs 126 and rested upon the lock pin 155 within the lower aperture 166 in the lock pin post 148 and the electrical switch 10 is manually operated once by rotating shaft 47, or if stored energy mechanism 37 is operated once by manual depression of push button 252 or 252', the "open" and "close" marking of the push buttons 252 and 252' no longer correctly indicate the position to which electrical switch 10 will be actuated upon operation of the corresponding push button.

Means are provided in the alternative embodiment of the invention shown in Figs. 14 to 18 to insure that electrical switch 10 is always opened upon manual depression of "open" push button 252 and always closed upon depression of "close" push button 252' regardless of the number of manual operations of switch 10 independent of the stored energy mechanism 37 and regardless of the number of operations of stored energy mechanism 37 independent of electrical switch 10.

One terminal of a mercury-filled, electrical switch 258 is connected by conductor 259 to solenoid 56, and one terminal of a mercury-filled electrical switch 258' is similarly connected by conductor 259' to solenoid 56'. Means are provided to open and close electrical switches 258 and 258' alternately upon operation of the stored energy mechanism 37. The means to actuate switches 258 and 258' are identical and only the means associated with switches 258 will be described, the corresponding parts associated with switch 258' being given the same reference numerals with the addition of the prime (') designation. Electrical switch 258 includes a glass bulb 260 filled with mercury and releasably secured within a spring clip 262 which is rigidly affixed by suitable means such as welding (not shown) to a pivotable elongated support plate 263 fitting at its ends within diametrically extending slots in cylindrical pivot members 265. Pins 266 integral with and extending axially from the pivot members 265 protrude through clearance holes near the free end of L-shaped brackets 268 mounted by screws 269 upon the abutment 239 to permit pivotal movement of support plate 263.

Figure 17:
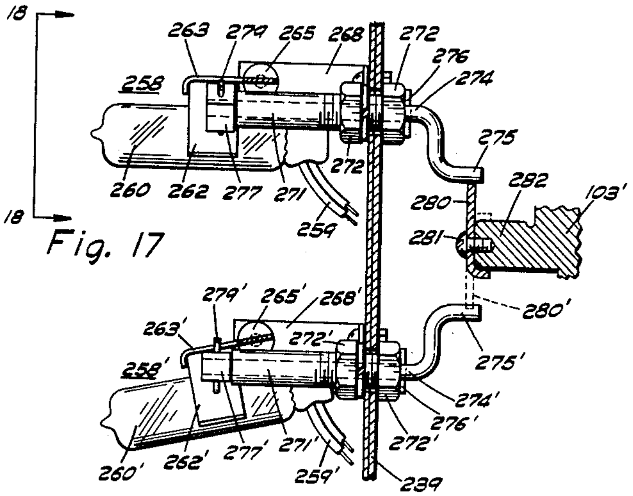
Figs. 16 to 18 show details of the embodiment of Fig. 14.
Figure 18:
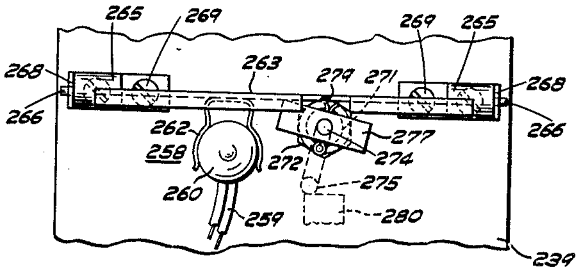
Figure 16:
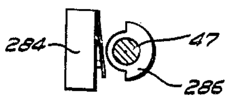

A sleeve 271 threaded at one end protrudes through an aperture in abutment 239 between the ends of plate 263, and nuts 272 threadably engaging sleeve 271 on opposite sides of abutment 239 rigidly mount sleeve 271 on abutment 239. Sleeve 271 rotatably receives a shaft 274 bent in Z-shape to provide a crank arm 275 on the side of abutment 239 away from switch 258. A pin 276 extending transversely through shaft 274 prevents axial movement of shaft 274 in a direction toward switch 258, and a clearance hole in a rectangular actuating cam 277 receives the opposite end of shaft 274. A cotter pin 279 extending transversely through cam 277 and shaft 274 rigidly affixes cam 277 to shaft 274. The pivotable support plate 263 rests upon cam 277, and actuation of crank arm 275 rotates shaft 274 and cam 277 to actuate pivotable plate 263 from a normal position, wherein it is tilted at a downward angle and switch 258 is open, to a horizontal position wherein switch 258 is closed. When support plate 263 is in its normal position, bulb 260 is tilted downward (bulb 260' being shown in this tilted position in Fig. 17) and the mercury does not bridge the electrical contacts therein, whereas when plate 263 is actuated to a horizontal position the bulb 260 is also operated to a horizontal position as shown in Figs. 17 and 18 and the mercury bridges the electrical contacts therein.

Shaft 274 is rotated to operate switch 258 when crank arm 275 is actuated by an actuating arm 280 secured by a screw 281 to a circumferential flange 282 on the upper spring coupling member 103'. Actuating arms 280 and 280' are secured in diametrically opposite positions on flange 282 and extend in opposite directions parallel to the axis of shaft 47.

Actuating arm 280 actuates crank arm 275 to rotate shaft 274 and tilt bulb 260 of mercury switch 258 to a horizontal position, wherein it closes the electrical circuit to solenoid 56, when the cam 52 is against cam follower 164 of latch 53, and in this position actuating arm 280' is disposed 180 degrees from crank arm 275'. When the energizing circuit through switch 258 to solenoid 56 is completed by depression of push button 252, the output end of stored energy mechanism 37 and upper coupling member 103' are rotated through 180 degrees until cam 52 comes against cam follower 164' of latch 53' and actuating arm 280' strikes crank arm 275' to operate glass bulb 260' of switch 258' to the horizontal position and close the electrical circuit to solenoid 56'.

Figure 15:
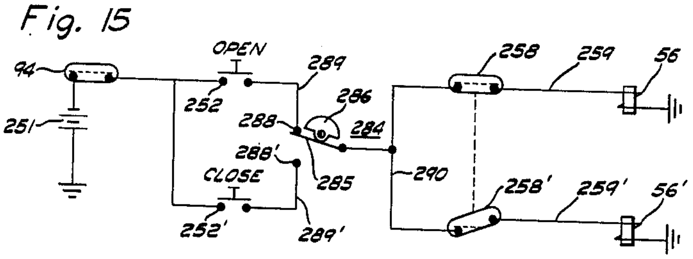
Fig. 15 is a schematic wiring diagram of the alternative embodiment of Fig. 14.
Figure 14:
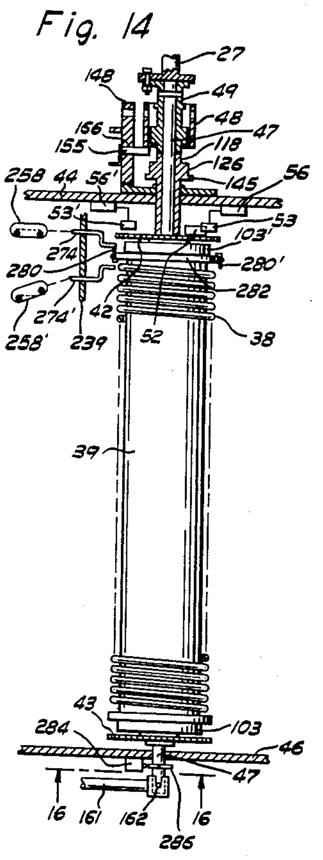
Fig. 14 is a diagrammatic view, partly in section, of an alternative embodiment of the invention.

A single pole, double throw switch 284 having an operating arm 285 (see Fig. 15) actuated upon operation of electrical switch 10 alternately connects push buttons 252 and 252' to a conductor 290 common to one side of both mercury-filled switches 258 and 258'. Switch 284 is mounted upon the lower plate 46 and is operated by a cam 286 secured to the operating shaft 47 beneath the lower plate 46. The shaft 47 is rigidly secured to the shaft 27 of electrical switch 10, and when electrical switch 10 is operated cam 286 actuates switch arm 285 to open the circuit to one push button and close the circuit to the other. For example, Fig. 15 illustrates the apparatus with the electrical switch 10 closed, and when "open" push button 252 is depressed to energize solenoid 56, operation of electrical switch 10 to the open position actuates cam 286 to disengage switch arm 285 from contact 288 and into engagement with contact 288'.

This switching operation prepares an energizing circuit from "close" push button 252′ through conductor 289′, contact 288′, switch arm 285, conductor 290, and switch 258′ to solenoid 56′. It will be noted that the circuit to "open" push button 252 is opened when switch arm 285 is disengaged from contact 288 by cam 286.

It may facilitate the understanding of the alternative embodiment of Figs. 14 to 18 to describe the sequence of operations when the electrical switch 10 and stored energy mechanism 37 are operated independently of each other. If electrical switch 10 is open and clutch 48 is raised to a position wherein it rests on lock pin 155 within aperture 166 and shaft 47 is actuated manually by tool 161 to close electrical switch 10, operating arm 285 is actuated by cam 286 into engagement with contact 288 when shaft 47 is rotated and opens the circuit over conductor 289′ to "close" push button 252′ and closes the circuit over conductor 289 to "open" push button 252. The apparatus is then in the condition shown in Fig. 15 and the electrical switch 10 is closed. Nothing will happen if "close" push button 252′ is depressed, but operation of "open" push button 252 will engage solenoid 56 through mercury switch 258 to operate the stored energy mechanism 37 to rotate electrical switch 10 to open position.

If electrical switch 10 is closed and clutch 48 is resting on lock pin 155 so that shafts 27 and 47 are disconnected and "open" push button 252 is depressed to energize solenoid 56 through mercury switch 258, and thus cause hub 118 and the output end of the stored energy mechanism to rotate through 180 degrees, electrical switch 10 and switch 285 will not be operated but crank arm 275 will be released by actuating arm 280 to open mercury switch 258 and crank arm 275′ will be actuated by actuating arm 280′ to close mercury switch 258′. If lock pin 155 is now retracted and clutch 48 dropped until it rests on radial extensions 145, and thus operatively connect hub 118 to coupling 49, and "open" push button 252 is depressed, an electrical circuit will be completed through switches 284 and 258′ to energize solenoid 56′ and thus rotate shaft 27 through 180 degrees to open electrical switch 10.

It will be apparent that it is impossible in the embodiment of Figs. 14 to 18 for the "open" and "close" push buttons 252 and 252′ to get out of sequence with the corresponding positions of electrical switch 10. If the switch 10 is manually operated independent of stored energy mechanism 37, switch arm 285 is actuated by cam 286 to switch the conductor 290 to the opposite push button so that the push buttons are still in agreement with the switch positions. Similarly if stored energy mechanism 37 is operated independent of electrical switch 10, the mercury switches 258 and 258′ are opened and closed alternately to prepare an energizing circuit to the opposite solenoid 56 or 56′. Upon each operation of electrical switch 10 by the stored energy mechanism 37 in the conventional manner, switch 284 opens the circuit to one push button 252 or 252′ and closes the circuit to the other, and mercury switches 258 and 258′ are opened and closed alternately to prepare an energizing means to the corresponding solenoid 56 or 56′.

It is apparent that the 180 degree rotation of the output shaft 47 can be readily converted to reciprocating motion by any of the means well known in the art, and the stored energy device of the invention has been found particularly adaptable to the actuation of electrical switches operated by reciprocation of a thrust rod parallel to a wooden pole. Although the greatest advantage can be taken the many novel features of the invention if the output is taken off in the form of rotation of the output shaft 47, it will be appreciated that any device to be operated from a stored energy apparatus may be driven directly from the output end of the helical springs 38 and 40, for example from the upper toothed gear 42 through the chain drive 68.

While we have shown only two specific embodiments of the invention, it is to be understood that many modifications may be made, and we intend by the appended claims to cover all such modifications as fall within the true spirit and scope of the invention.

What we claim as new and desire to secure by Letters Patent of the United States is:

1. In a stored energy mechanism, in combination, a rotatably mounted output shaft, a helical spring coaxial with and surrounding said shaft and having an input end and an output end, a rotatably mounted driving member continuously connected operatively to the output end of said spring and releasably connected to said shaft, means for normally latching said driving member against rotation, and means including a motor to wind the input end of said spring and to prevent movement of said input end in a direction to unwind said spring, said latching means being operable to release said driving member to permit rotation of said shaft under the influence of energy stored in said spring.

2. In a stored energy mechanism, in combination, a helical spring having an input end and an output end, a rotatably mounted driving member coaxial with and operatively connected continuously to the output end of said spring, an output shaft extending axially through said spring and releasably connected to said driving member, a plurality of latching means disposed away from the axis of said spring in peripherally spaced apart positions and each being adapted to engage and latch said driving member against rotation, means for winding the input end of said spring and for retaining said spring in wound condition, each of said latching means being operable to release said driving member to permit rotation therof under the influence of energy stored in said spring through a fraction of a revolution until said driving member engages another of said latching means, and manually controlled means for independently operating said latching means.

3. In a stored energy mechanism, in combination, an output shaft, a helical spring having an input end and an output end and operatively connected to said shaft at said output end, means for normally latching the output end of said spring against movement, drive means to wind the input end of said spring and to hold said spring in wound condition, said latching means being operable to release the output end of said spring to permit actuation of said shaft under the influence of energy stored in said spring, and braking means continuously operatively connected between the input and output ends of said spring responsive to the output torque available from said spring for directly controlling the speed of movement of the output end of said spring.

4. In a stored energy mechanism, in combination, a helical spring having an input end and an output end, a rotatably mounted member operatively connected to the output end of said spring, means for normally latching the output end of said spring against rotation, means including a motor for winding the input end of said spring and for holding said spring in wound condition, said latching means being operable to release the output end of said spring to permit rotation of said member under the influence of energy stored in said spring, braking means for controlling the speed of movement of the output end of said spring, and means operatively engaging both the output end of said spring and said winding means for controlling the retarding force exerted by said braking means and for controlling the actuation of said motor as a function of the energy wound into said spring.

5. In a stored energy mechanism, in combination, a rotatably mounted output shaft, a helical spring having an input end and an output end, a rotatably mounted member, the output end of said spring being operatively connected to both said member and said shaft, means for normally latching said member against rotation, means including a motor to wind the input end of said spring and to prevent movement of said input end in a direction to unwind said spring, braking means for controlling the speed of rotation of said member, and differential means operatively engaging both said winding means and said member for varying the magnitude of the retarding force exerted by said braking means as a function of the output torque available from said spring, said latching means being operable to release said member to permit rotation of said shaft under the influence of energy stored in said spring.

6. In a stored energy mechanism, in combination, an output shaft, a helical spring having an input end and an output end and operatively connected to said shaft at said output end, means for normally latching the output end of said spring against movement, drive means to wind the input end of said spring and to hold said spring in wound condition, said latching means being operable to release the output end of said spring to permit actuation of said shaft under the influence of energy stored in said spring, and braking means for controlling the speed of movement of the output end of said spring including a closed hydraulic system having an orifice therein, a hydraulic pump driven from the output end of said spring for forcing fluid through said closed hydraulic system and through said orifice, means for varying the area of said orifice, and differential means connected between the input and output ends of said spring for controlling said area varying means as a function of the output torque available from said spring.

7. In a stored energy mechanism, in combination, a helical spring having an input end and an output end, a rotatable output shaft extending axially within said spring, a rotatably mounted driving member coaxial with and operatively connected continuously to the output end of said spring and releasably engaging said shaft, means for normally latching said driving member against movement, drive means including a motor for winding the input end of said spring and for holding said spring in wound condition, said latching means being operable to release said driving member to permit rotation thereof under the influence of energy stored in said spring, means for actuating said motor to wind the input end of said spring, and differential means connected between the input and output ends of said spring for controlling said actuating means as a function of the energy wound into said spring.

8. In a stored energy mechanism in accordance with claim 7 wherein said motor is electrically actuated and said actuating means includes an electrical switch operated by said differential means and electrically connected in the actuating circuit to said motor and wherein said driving member carries a cam and said latching means includes a plurality of means in spaced apart positions about the periphery of said driving member adapted to interfere with said cam to prevent rotation of said driving member and being operable to release said cam to permit rotation of said driving member through a fraction of a revolution until said cam engages another of said latching means.

9. In a stored energy mechanism in accordance with claim 8 wherein said electrical switch is mercury-filled and tiltable from a first position, wherein the mercury within said switch opens the actuating circuit to said motor, to a second position wherein the mercury closes the actuating circuit to said motor, and including a pivotably mounted support, said switch being secured to said support, and resilient means normally retaining said support in a position wherein said electrical switch is in said first position.

10. In a stored energy mechanism in accordance with claim 9 wherein said differential means includes a threaded first driving member rotatably driven from the output end of said spring, a second driving member rotatably driven by said motor, and a single elongated follower rod threadably engaging said first driving member and being rotatably driven by and movable axially relative to said second driving member to permit axial advancement and withdrawal of said follower rod relative to said first driving member, said support being actuated by said follower rod to control the opening and closing of said switch.

11. In a stored energy mechanism, in combination, a helical spring having an input end and an output end, a rotatably mounted member coaxial with and operatively connected to the output end of said spring, means for normally latching the output end of said spring against movement, drive means including a motor for winding the input end of said spring and for holding said spring in wound condition, said latching means being operable to release the output end of said spring to actuate said member, braking means for controlling the speed of movement of the output end of said spring, means for varying the magnitude of the retarding force exerted by said braking means, means for energizing said motor to wind the input end of said spring, and differential means connected between the input and output ends of said spring for controlling said varying means and said energizing means as a function of the output torque available from said spring.

12. In a stored energy mechanism, in combination, an output shaft, a helical spring having an input end and an output end and operatively engaging said shaft at said output end, means for normally latching the output end of said spring against movement, means including a motor to wind the input end of said spring and to retain said spring in wound condition, said latching means being operable to release said output end of said spring to actuate said shaft, a differential follower rod threaded at one end, a threaded differential first driving member rotatably driven from the output end of said spring and engaging the threaded end of said follower rod, a differential second driving member rotatably driven by said motor and operatively connected to the end of said follower rod opposite said threaded end to rotate said rod, said rod being axially movable relative to said second driving member to permit axial advancement and withdrawal of said follower rod relative to said first driving member, braking means for retarding the speed of movement of the output end of said spring, means controlled by said follower rod for varying the magnitude of the retarding force exerted by said braking means, and means actuated by said follower rod for energizing said motor to wind the input end of said spring.

13. In a stored energy mechanism, in combination, a helical spring having an input end and an output end, a rotatably mounted member operatively connected to the output end of said spring, means for normally latching said rotatably mounted member against rotation and including an electrically operated solenoid, means including a motor to wind the input end of said spring and to retain said spring in wound condition, a differential follower rod threaded at one end, a threaded differential first driving member rotatably driven from the output end of said spring and engaging the threaded end of said follower rod, a differential second driving member rotatably driven by said motor and operatively connected to the end of said follower rod opposite said threaded end to rotate said follower rod, said follower rod being movable axially relative to said second driving member to permit axial advancing and receding of said follower rod relative to said first driving member, means actuated by said follower rod for controlling the energization of said motor as a function of the energy wound into said spring, said solenoid being adapted upon operation to release said rotatably mounted member to permit rotation thereof under the influence of energy wound into said spring, and electrical switch means connected in the operating circuit to said solenoid and controlled by said follower rod for opening the circuit to said solenoid after a predetermined amount of energy has been released from said spring.

14. In a stored energy mechanism, in combination, an output shaft, a helical spring having an input end and an output end and operatively connected to said shaft at said output end, means for normally latching the output end of said spring against movement, drive means to wind the input end of said spring and to hold said spring in wound condition, said latching means being operable to release the output end of said spring to permit actuation of said shaft under the influence of energy stored in said spring, and braking means for controlling the speed of movement of the output end of said spring including a hydraulic system having an orifice therein, a hydraulic pump driven from the output end of said spring for forcing fluid through said closed hydraulic system and through said orifice, a differential follower rod threaded at one end, a threaded differential first driving member rotatably driven from the output end of said spring and engaging the threaded end of said follower rod, a differential second driving member rotatably driven by said drive means and operatively connected to the end of said follower rod opposite said threaded end to rotate said follower rod, said follower rod being movable axially relative to said second driving member to permit axial advancement and withdrawal of said rod relative to said first driving member, and means actuated by said follower rod for varying the area of said orifice.

15. In a stored energy mechanism, in combination, a helical spring having an input end and an output end, a rotatably mounted member operatively connected to the output end of said spring, a raised cam rigid with said member away from the axis thereof, a pair of pivotally mounted latch arms disposed in diametrically opposite positions, a cam follower on each latch arm rotatably mounted thereon, each latch arm being pivotable from a first position, wherein the cam follower mounted thereon is adapted to engage and interfere with said cam to prevent rotation of said member, to a second position wherein said cam follower is free of said cam and said member is free to rotate through half a revolution until said cam engages the cam follower mounted on the latch arm disposed diametrically opposite therefrom, means to normally hold said latch arms in said first position, means including a pair of solenoids to independently release said latch arms to permit movement thereof from said first position to said second position under the influence of energy stored in said spring, and drive means for winding the input end of said spring and for retaining said spring in wound condition.

16. In a stored energy mechanism, in combination, a helical spring having an input end and an output end, a rotatably mounted member coaxial with and operatively connected to the output end of said spring, a cam rigid with said member, a plurality of latching means disposed away from the axis of said spring in peripherally spaced apart positions and each being adapted to engage said cam to prevent rotation of said member and also being operable to release said cam to permit rotation of said member through a fraction of a revolution until said cam engages another of said latching means, each latching means including a pivoted arm, spring means urging said arm to a first position wherein said arm is adapted to engage said cam, means for normally locking said arm in said first position, and a solenoid for actuating said locking means to release said arm to permit its rotation under the influence of energy stored in said spring and exerted through said cam to a second position wherein said arm is free of said cam, means including a motor for winding the input end of said spring and for retaining said spring in wound condition, and differential means connected between the input and output ends of said spring for controlling the actuation of said motor as a function of the energy wound into said spring.

17. An electrical switch installation comprising, in combination, an electrical switch having a rotatable operating shaft and adapted to be operated between open and closed positions upon rotation of said shaft, a stored energy mechanism for operating said switch comprising a helical spring having an input end and an output end, an output shaft coaxial with and extending through said spring and rigidly affixed to the operating shaft of said switch, a rotatably mounted driving member continuously operatively connected to the output end of said spring, means for normally latching the output end of said spring against movement, drive means to wind the input end of said spring and to retain said spring in wound condition, said latching means being operable to release the output end of said spring to permit actuation of said driving member from the energy stored in said spring, and means for releasably connecting said driving member to said output shaft, whereby said electrical switch may be operated independent of said stored energy mechanism by rotation of said output shaft when the connection between said driving member and said shaft is released.

18. In an electrical switch installation in accordance with claim 17 wherein said driving member has a pair of diametrically opposite, radially extending lugs rigid therewith, said output shaft has a pair of diametrically opposite, radially extending lugs rigid therewith adjacent said lugs on said driving member, and said releasable connecting means includes a hollow clutch coupling fitting over and closely embracing the lugs on both said driving member and said output shaft and providing a driving connection therebetween.

19. In an electrical switch installation in accordance with claim 18 wherein said clutch coupling is provided with a radially extending aperture for receiving a locking pin and is movable to a switch locking position wherein said coupling is free of the lugs on said driving member but in engagement with the lugs on said output shaft, and including a fixed support and a radially extending locking pin slidably mounted on said support and adapted to be slidably inserted into the aperture in said clutch coupling to lock said switch against movement when said coupling is moved to said switch locking position, whereby said stored energy mechanism may be operated independently of said electrical switch when said locking pin is within said aperture in said coupling.

20. In a stored energy device, in combination, a helical spring having an input end and an output end, a rotatably mounted output shaft having a noncircular radially extending portion rigid therewith, a rotatably mounted member operatively continuously connected to the output end of said spring and having a noncircular radially extending portion rigid therewith, said shaft and said member being coaxial with said spring, a hollow clutch having a noncircular inner periphery releasably fitting over and closely embracing the noncircular portion on both said shaft and said member and providing a driving connection between said shaft and said member, means for normally latching the output end of said spring against movement and means for winding the input end of said spring and for retaining said spring in wound condition, said latching means being operable to release the output end of said spring to permit actuation of said member and said shaft under the influence of energy stored in said spring.

21. In a stored energy mechanism, in combination, a pair of concentric helical springs disposed one within the other and each having an input end and an output end, a rotatably mounted member coaxial with and operatively connected to the output end of both of said springs, means for normally latching the output end of both said springs against rotation, means including a motor to wind the input end of both said springs and to retain said springs in wound condition, said latching means being operable to release the output end of said springs to permit actuation of said member under the influence of energy stored in said springs, and means operatively engaging both the input and the output ends of said springs for controlling the actuation of said motor as a function of the energy wound into said springs.

22. In a stored energy mechanism, in combination, a pair of concentric helical springs disposed one within the other and each having an input end and an output end, a rotatably mounted driven member coaxial with and operatively connected to the input end of both said springs, a rotatably mounted member coaxial with both said springs, a rotatably mounted output shaft extending axially through both of said springs and through said member and being releasably connected to said member, the output end of both said springs being operatively connected continuously to said member, means for normally latching said member against rotation, drive means to rotate said driven member to wind the input end of said springs and to prevent rotation of said driven member in a direction to unwind said springs, said latching means being operable to release said member to permit rotation of said shaft under the influence of energy stored in said springs.

23. In a stored energy mechanism, in combination, a pair of concentric helical springs disposed one within the other and each having an input end and an output end, a rotatably mounted driving member coaxial with and operatively connected to the output end of both said springs, a driven member coaxial with and operatively connected to the input end of both said springs, an output shaft extending axially through said springs and through both said driving and said driven members and being rotatable independently of said springs and said members, means for releasably connecting said driving member and said output shaft, means for normally latching the output end of said springs against rotation, means including a motor for rotating said driven member to wind the input end of said springs and to retain said springs in wound condition, said latching means being operable to release the output end of said springs to permit rotation of said output shaft under the influence of energy stored in said springs.

24. In a stored energy mechanism in accordance with claim 23 where said driving member has a pair of diametrically opposite, radially extending lugs rigid therewith, said output shaft has a pair of diametrically opposite, radially extending lugs rigid therewith adjacent the pair of lugs on said driving member, and said releasable connecting means includes a hollow clutch having an inner periphery fitting over and closely embracing both said pairs of lugs.

25. In a stored energy mechanism, in combination, a pair of concentric helical springs disposed one within the other and each having an input end and an output end, a rotatably mounted, driven toothed gear coaxial with and operatively connected to the input end of both said springs, a rotatably mounted, driving toothed gear coaxial with said springs, a rotatably mounted member, the output end of both said springs being operatively connected to said driving gear and to said member, means for normally latching said driving gear against rotation, a motor for winding the input end of said springs, a first chain drive connecting the output of said motor to said driven gear, braking means including a hydraulic pump connected in a closed hydraulic system having a variable area orifice therein and a second chain drive connecting said driving gear to said hydraulic pump for controlling the speed of rotation of said driving gear, and means engaging both said first and said second chain drives for varying the area of said orifice as a function of the output torque available from said springs, said latching means being operable to release said driving gear to permit actuation of said member under the influence of energy stored in said springs.

26. In a stored energy device, in combination, a helical spring having an input end and an output end, a rotatably mounted output shaft operatively connected to the output end of said spring, means for normally latching the output end of said spring against movement, drive means to wind the input end of said spring and to prevent movement of said input end in a direction to unwind said spring, said latching means being operable to release the output end of said spring to permit actuation of said output shaft, and means for controlling the speed of movement of the output end of said spring including a hydraulic pump having an inlet and an outlet, means for providing a driving connection between the output end of said spring and said pump, a closed cylinder having an inlet passage and an outlet passage, the outlet of said pump being connected to the inlet passage of said cylinder and the outlet passage of said cylinder being connected to the inlet of said pump to provide a closed hydraulic system, a member within said cylinder obstructing passage of fluid between inlet and outlet passages of said cylinder and having a plurality of radially extending orifices therethrough spaced apart axially and in register with both the inlet and the outlet passage of said cylinder, a valve slidable axially in one direction within said cylinder to sequentially obstruct a plurality of said orifices and in the opposite direction to sequentially open said obstructed orifices, and means between the input and output ends of said spring for controlling the axial movement of said valve within said cylinder as a function of the energy stored in said spring.

27. In a stored energy mechanism, in combination, a pair of rotatably mounted, toothed gears, a helical spring having an input end operatively connected to the first of said gears and an output end operatively connected to the second of said gears, means for normally latching the second of said gears against rotation, drive means including a motor and a first chain engaging said first gear for winding the input end of said spring and for preventing rotation of said first gear in a direction to unwind said spring, said latching means being operable to release the second of said gears to permit rotation thereof under the influence of energy stored in said spring, a hydraulic pump having an inlet and an outlet, a second chain providing a driving connection between said second gear and said pump, a closed cylinder having an inlet passage and an outlet passage, the outlet of said pump being connected to the inlet passage of said cylinder and the outlet passage of said cylinder being connected to the inlet of said pump, a sleeve within said cylinder obstructing passage of fluid between inlet and outlet passages of said cylinder and having a plurality of radially extending orifices therethrough spaced apart axially and in register with both the inlet and the outlet passages of said cylinder, a valve slidable axially in one direction within said cylinder to sequentially obstruct a plurality of said orifices and in the opposite direction to sequentially open said obstructed orifices, a differential follower rod threaded at one end, a threaded differential first driving member rotatably driven by said second chain and engaging the threaded end of said follower rod, a differential second driving member rotatably driven by said first chain and operatively connected to the end of said follower rod opposite said threaded end to rotate said follower rod, said follower rod being axially movable relative to said second driving member to permit axial advancement and recession of said follower rod relative to said first driving member, the axial position of said valve within said cylinder being controlled by said follower rod.

28. In a stored energy mechanism, in combination, a pair of concentric helical springs disposed one within the other and each having an input end and an output end, a rotatably mounted first toothed gear coaxial with and operatively connected to the input end of both said springs, a rotatably mounted second toothed gear coaxial with said springs, an output shaft extending axially through both said springs and through both said gears, the output end of both said springs being operatively connected to said second gear and to said shaft, a cam on said second gear disposed away from the axis thereof, first latching means in the path of movement of said cam for preventing rotation of said second gear and second latching means also in the path of movement of said cam and disposed in diametrically opposite relation to said first latching means for preventing rotation of said second gear, means including a motor and a first chain drive engaging said first toothed gear for winding the input end of said springs to store energy in said springs while one of said latching means is in interfering relation with said cam and for preventing rotation of said first gear in a direction to unwind said springs, said first and second latching means being independently operable to a position wherein said cam is free to permit said second gear to rotate through half a revolution under the influence of energy wound in said springs until said cam comes into interfering relation with the other of said latching means, braking means including a closed hydraulic system having a compensating orifice therein and a hydraulic pump for forcing liquid through said hydraulic system and through said orifice to retard the speed of rotation of said second gear, means for providing a driving connection between said second gear and said pump, and differential means operatively connected to both of said gears for varying the size of said compensating orifice as a function of the energy wound into said springs.

29. In a stored energy mechanism wherein the output end of a helical spring is releasably latched against movement and the input end of said spring is wound to store energy in said spring, means to control the speed of rotation of the output end of said spring including a hydraulic pump having an inlet and an outlet, means for providing a driving connection between the output end of said spring and said pump, a closed cylinder having an inlet passage and an outlet passage, the outlet of said pump being connected to the inlet passage of said cylinder and the outlet passage of said cylinder being connected to the inlet of said pump, whereby a closed hydraulic circuit is provided, a sleeve within said cylinder obstructing passage of fluid between inlet and outlet passages of said cylinder and having a plurality of radially extending, axially spaced apart orifices therethrough in register with both the inlet and outlet passages of said cylinder, a valve slidable axially within said sleeve between a first position wherein at least certain of said orifices are obstructed and a plurality of succeeding positions in each of which an additional one of the obstructed orifices is opened, and means connected between the input and output ends of said spring for controlling the axial position of said valve within said cylinder as a function of the energy stored in said spring.

30. In a stored energy device in accordance with claim 29 wherein said sleeve has a plurality of peripherally spaced apart sets of radially extending orifices therethrough, the orifices of each set being of equal size and spaced apart axially, the orifices of the different sets being of progressively different sizes, said valve being adapted to obstruct said sets of orifices and having a radially extending aperture therethrough of sufficient size to register with a plurality of the orifices of a single set of orifices to permit communication between inlet and outlet passages of said cylinder through the orifices in register with said aperture, said valve being rotatable to bring said aperture into alignment with one set of said orifices and being slidable axially between a first position wherein at least certain of said orifices of said one set are obstructed by said valve and the remainder of the orifices of said one set are in register with said aperture and a plurality of succeeding positions in each of which an additional one of the obstructed orifices of said one set is brought into register with said aperture.

31. In a stored energy mechanism wherein the output end of a helical spring is releasably latched against movement and the input end of said spring is wound to store energy in said spring, means to control the speed of rotation of the output end of said spring including a closed hydraulic system having a plurality of orifices therein, a pump for forcing fluid through said closed hydraulic system and through said orifices, means for providing a driving connection between the output end of said spring and said pump, valve means movable in one direction to sequentially close a plurality of said orifices and movable in the opposite direction to sequentially open said closed orifices, and differential means connected between the input and output ends of said spring for controlling the movement of said valve means as a function of the output torque available from said spring.

32. In a stored energy mechanism, in combination, a pair of concentric helical springs disposed one within the other and each having an input end and an output end, a rotatably mounted driven member coaxial with and operatively connected to the input end of both said springs, a rotatably mounted driving member coaxial with and operatively connected to the output end of both said springs, means for normally latching said driving member against rotation, means including a motor for rotating said driven member to wind the input end of said springs, braking means driven by said driving member for controlling the speed of movement of the output end of said springs, and differential means operatively engaging both said driving and said driven member for varying the magnitude of the retarding force exerted by said braking means as a function of the energy wound into said springs, said latching means being operable to release said driving member to permit its rotation under the influence of energy wound in said springs.

33. In a stored energy mechanism, in combination, a helical spring having an input end and an output end, a rotatably mounted member operatively connected to the output end of said spring, means for normally latching the output end of said spring against movement, means including a motor to wind the input end of said spring and to prevent movement of said input end in a direction to unwind said spring, braking means for retarding the speed of movement of the output end of said spring, a differential follower rod threaded at one end, a threaded differential first driving member rotatably driven from the output end of said spring and engaging the threaded end of said follower rod, a differential second driving member rotatably driven by said motor and operatively connected to the end of said follower rod opposite said threaded end to rotate said follower rod, said follower rod being movable axially relative to said second driving member to permit axial advancement and withdrawal of said follower rod relative to said first driving member, and means actuated by said follower rod for controlling the magnitude of the retarding force exerted by said braking means.

34. In a stored energy mechanism in accordance with claim 7 wherein said latching means includes a solenoid adapted when actuated to operate said latching means to release said driving member and including an electric switch connected in the operating circuit to said solenoid and controlled by said differential means for opening the circuit to said solenoid after a predetermined amount of energy has been released from said spring.

35. In a stored energy mechanism in accordance with claim 2 wherein said driving member carries a cam adapted to engage each of said latching means and including resilient means between said cam and said driving member for absorbing shock when said cam engages one of said latching means.

36. In a stored energy mechanism, in combination, a driving spring, a rotatable driven member coaxial with and operatively connected to the output end of said spring, stop means normally holding said driven member against rotation and comprising two normally engaged, relatively movable elements one of which is carried by said driven member and the other of which is carried by a stationary support, resilient means normally biasing said elements into engagement, releasing means for said stop means normally biased to an inoperative position, said two elements being movable out of engagement upon operation of said releasing means to release said driven member for rotation, and charging means operatively connected to the input end of said spring and operable to charge said spring after said releasing means has been operated to permit said spring to rotate said driven member.

37. In a stored energy mechanism in accordance with claim 36 and including resilient means for absorbing shock when said one element comes into engagement with said other element.

38. In a stored energy mechanism, in combination, a driving spring, a rotatable driven member coaxial with and operatively connected to the output end of said spring, stop means normally holding said driven member against rotation and comprising two normally engaged, relatively movable elements one of which is carried by said driven member and the other of which is carried by a stationary support, resilient means normally biasing said elements into engagement, releasing means for said stop means normally biased to an inoperative position, said two elements being movable out of engagement upon operation of said releasing means to release said driven member for rotation, a rotatable element operatively connected to the input end of said spring, and charging means including an electric motor operatively connected to said rotatable element and operable to charge said spring and an electrical switch operable to complete an electric circuit to energize said motor after said releasing means has been operated to permit said spring to rotate said driven member.

References Cited in the file of this patent

UNITED STATES PATENTS

| | | |
|---|---|---|
| 634,068 | Porter | Oct. 3, 1899 |
| 1,076,314 | Pitman | Oct. 21, 1913 |
| 1,254,060 | Mottlau | Jan. 22, 1918 |
| 1,395,802 | Dickinson | Nov. 1, 1921 |
| 1,481,777 | Rosenfield | Jan. 22, 1924 |
| 1,751,903 | Browning | Mar. 25, 1930 |
| 1,818,698 | Dicke | Aug. 11, 1931 |
| 2,360,422 | Howell | Oct. 17, 1944 |
| 2,521,978 | Inger | Sept. 12, 1950 |

U. S. DEPARTMENT OF COMMERCE

PATENT OFFICE

CERTIFICATE OF CORRECTION

Patent No. 2,822,445 February 4, 1958

Carl Schindler et al.

It is hereby certified that error appears in the printed specification of the above numbered patent requiring correction and that the said Letters Patent should read as corrected below.

Column 19, line 11, before "hydraulic", first occurrence, insert -- closed --.

Signed and sealed this 8th day of April 1958.

(SEAL)

Attest:

KARL H. AXLINE

Attesting Officer

ROBERT C. WATSON

Commissioner of Patents